United States Patent [19]
Böjeryd

[11] Patent Number: 5,771,465
[45] Date of Patent: Jun. 23, 1998

[54] APPARATUS FOR PROVIDING A MOBILITY ADJUNCT FOR THE PUBLIC SWITCHED TELEPHONE NETWORK

[75] Inventor: Nils Böjeryd, Richardson, Tex.

[73] Assignee: Telefonaktiebolaget LM Ericsson, Stockholm, Sweden

[21] Appl. No.: 818,244

[22] Filed: Mar. 14, 1997

Related U.S. Application Data

[63] Continuation of Ser. No. 460,851, Jun. 5, 1995, abandoned.

[51] Int. Cl.⁶ .............................. H04M 11/00; H04Q 7/00
[52] U.S. Cl. .......................... 455/554; 455/426; 395/401
[58] Field of Search .................................. 455/426, 422, 455/445, 465, 520, 554; 395/401

[56] References Cited

U.S. PATENT DOCUMENTS

| | | | |
|---|---|---|---|
| 4,574,164 | 3/1986 | Orikasa | 179/2 EB |
| 4,599,490 | 7/1986 | Cornell et al. | 179/2 EB |
| 4,640,986 | 2/1987 | Yotsutani et al. | 379/60 |
| 4,658,096 | 4/1987 | West, Jr. et al. | 379/59 |
| 4,737,975 | 4/1988 | Shafer | 379/58 |
| 4,748,655 | 5/1988 | Thrower et al. | 379/60 |
| 4,775,997 | 10/1988 | West, Jr. et al. | 379/58 |
| 4,839,918 | 6/1989 | Hata | 379/61 |
| 4,890,315 | 12/1989 | Bendixen et al. | 455/554 |
| 4,903,263 | 2/1990 | Patel et al. | 370/110.1 |
| 4,922,517 | 5/1990 | West, Jr. et al. | 379/58 |
| 4,980,907 | 12/1990 | Raith et al. | 379/63 |
| 5,282,240 | 1/1994 | Buhl et al. | 379/59 |
| 5,307,399 | 4/1994 | Dai et al. | 455/426 X |
| 5,313,654 | 5/1994 | Comroe et al. | 455/426 |
| 5,493,605 | 2/1996 | Akiyama et al. | 455/554 X |
| 5,495,484 | 2/1996 | Self et al. | 370/110.1 |
| 5,544,227 | 8/1996 | Blust et al. | 455/426 |
| 5,570,412 | 10/1996 | LeBlanc | 379/58 |
| 5,592,533 | 1/1997 | McHenry et al. | 379/58 |

FOREIGN PATENT DOCUMENTS

| | | |
|---|---|---|
| 2283881 | 5/1995 | United Kingdom . |
| WO9100677 | 1/1991 | WIPO . |
| WO9403993 | 2/1994 | WIPO . |
| WO9510925 | 4/1995 | WIPO . |

OTHER PUBLICATIONS

*Schnurlose Erweiterung digital*; 1269 tec Das technische Magazin von ASCOM (1993) No. 2, Bern, CH; pp. 33–34 [Only Figure considered; No translation provided.].

*Primary Examiner*—Allen R. MacDonald
*Assistant Examiner*—Scott Richardson
*Attorney, Agent, or Firm*—Jenkens & Gilchrist, P.C.

[57] ABSTRACT

A system and method for providing a mobility adjunct for a telecommunications network. The system and method allow one or more subscriber stations, connected to an analog interface of the network, and one or more wireless subscriber stations, each operating in a wireless telephone system of the network, to function as extension phones. The invention maintains a fixed line appearance and emulates a fixed termination in the network for the wireless subscriber station.

18 Claims, 9 Drawing Sheets

FIG.5A
FX-TRUNK TABLE

TS-1 | DN=123-4561
     | DN=123-4654
...
TS-24

FIG.5B
DN-TABLE

DN 123-4561 | HS=46
...
DN 123-4654 | HS=48
...
DN 123-4999

FIG.5C
HS-TABLE

HS 46 | RE=32
HS 48 | RE=34
...
HS 199

FIG.5D
Off-hook DN-TABLE

DN 555-4561 | FX=24,TS1
...
DN 555-4654 | FX=24,TS2
...
DN 555-4999

FIG.5E
Off-hook HS-TABLE

FX-Trunk table

| TS-1 | DN=500-123-4561 | | | | | |
|---|---|---|---|---|---|---|
| | | | | | | |

FIG. 11B

Off-hook DN-table

| DN | | 583-555-1234 | FX=24 TS=1 | | | |
|---|---|---|---|---|---|---|
| | | | | | | |

APPARATUS FOR PROVIDING A MOBILITY ADJUNCT FOR THE PUBLIC SWITCHED TELEPHONE NETWORK

This application is a continuation of application No. 08/460,851, filed on Jun. 5, 1995, now abandoned.

BACKGROUND OF THE INVENTION

1. Field of the Invention

This invention relates to the provision of extension services within a telecommunication switching system and, more particularly, to an apparatus which provides a mobility adjunct for the public switched telephone network.

2. History of the Related Art

Extension phone service is routinely provided in a Public Switched Telephone Network (PSTN) by connecting a set of two or more extension telephones to a single subscriber line. A call addressed to the number associated with the subscriber line results in ringing at all phones in the set of extension phones until at least one of the phones goes off hook to receive the call. When the subscriber desires to make a call, the call can be initiated by any of the extension phones going off hook, as if the extension phone were a single phone on the subscriber line. After either an outgoing or incoming call has been through connected on the line, any of the extension phones which go off hook are connected to the call and conversation can be had between any of the phones connected to the call.

Because a conventional extension phone set is made up of telephones which must be hard wireline, or, equivalently connected, to a single subscriber line, features provided with the conventional extension phone sets are limited to features provided by hard wireline telephones or, their equivalents such as cordless telephones. In this case the cordless telephone would consist of a handset in radio communication with a base station hard wireline connected to the subscriber line. For example, the ability of an extension phone to physically move or roam about while still functioning as an extension phone is limited to the roaming capabilities of a hard wireline phone, or the roaming capabilities provided by any cordless phone which could be used as the extension. This generally means that the mobility of an extension phone is limited to the length of the cord for a hard wireline phone, or the radio coverage area of the cordless phone portable base station that is hard wireline connected to the subscriber line. These limitations prevent offering features such as a feature which allows one or more of the set of extension phones to roam long distance, while still functioning as a true extension phone.

Long distance roaming capabilities are presently provided in cellular wireless telephone systems. Many types of cellular wireless systems have been developed, ranging from large scale cellular mobile systems serving large geographic areas, to localized wireless systems which may serve, for example, the area of a single business's factories or offices. The basic cellular telephone system consists of one or more base stations and one or more mobile telephones or handsets. The mobile telephones or handsets can move about the area served by the system while making and receiving phone calls. The area covered by the system is determined by transmission capabilities of each base station and the number and placement of these base stations throughout the system. No feature presently exists which allows a mobile telephone of a cellular system to function as one of a set of extension phones to which a hard wireline telephone of the PSTN belongs.

It would be a distinct advantage to have an apparatus which allows a mobile wireless telephone to be used as an extension phone to a wireline phone. This invention would combine the desirable characteristics of both extension phones and mobile phones and, would allow one or more of a set of extension phones to roam long distance while still functioning as a true extension phone. Also, this invention would allow a subscriber to have a single subscriber number assigned to both a conventional phone and mobile phone, and receive a call made to that subscriber number at either the conventional phone or the mobile phone. The present invention provides such an apparatus.

SUMMARY OF THE INVENTION

In order to overcome the deficiencies and shortcomings of the prior art, the present invention provides an apparatus comprising a mobility adjunct for use in a telecommunications network which allows one or more mobile wireless handsets and one or more wireline phones to function together as extension phones. The apparatus maintains a line appearance and emulates a fixed termination in the network for the handset. All existing services can be maintained for a subscriber. The system and method provides an advantage in that handset mobility, i.e. roaming and handover, is supported for the extension handset. Conventional extension phones do not provide mobility of this type.

In a first aspect of the invention an apparatus for providing wireless extension phone service within a telecommunications system is provided. The apparatus comprises a mobility adjunct that is connected to one or more subscriber lines of the telecommunications system. The mobility adjunct includes an FX-Trunk providing one or more timeslots for communications traffic. The apparatus also includes a Channel Bank that provides a connection between the subscriber lines and one or more dedicated timeslots of the FX-Trunk. Within the channel bank each of these dedicated timeslots is assigned to a specific subscriber line. The apparatus further includes a PCS Controller that provides a communications connection between the dedicated timeslots and a wireless radio system. Within the PCS Controller each of the dedicated timeslots is assigned to a specific wireless subscriber station of the wireless telephone system. A wireless subscriber station assigned a dedicated timeslot functions on the subscriber line to which that timeslot is assigned equivalently to a hardwireline subscriber station. By connecting the apparatus and one or more hardwireline subscriber stations to a subscriber line a set of extension phones including one or more wireless subscriber stations is created. The wireless subscriber stations provide support of mobility in the set of extension phones.

In a second aspect of the invention, the PCS controller contains a first data table associating each dedicated timeslot of the FX-Trunk with a first directory number that is used for call setup to one of the wireless subscriber stations within the wireless radio system. Call setup occurs when a dedicated timeslot has been seized by the channel bank.

In a further aspect of the invention, the PCS controller contains a second and third data table. The second data table associates each wireless subscriber station assigned a dedicated timeslot with a second directory number. The third data table associates the second directory number of each wireless subscriber station with the dedicated timeslot of the FX-Trunk assigned to the particular wireless subscriber station. Upon receiving an off-hook signal from a wireless subscriber station, the PCS controller performs a call setup over the FX-Trunk to the subscriber line to which the wireless subscriber station is assigned by referencing the second and third data tables.

In a second embodiment of the invention an alternative apparatus for providing wireless extension phone service within a telecommunications system is provided. The apparatus comprises a mobility adjunct that is connected to one or more subscriber lines of the telecommunications system. The mobility adjunct includes an FX-Trunk providing one or more timeslots for communications traffic. The apparatus also includes a channel bank that provides a connection between the subscriber lines and one or more dedicated timeslots of the FX-Trunk. Within the channel bank each of these dedicated timeslots is assigned to a subscriber line. The apparatus further includes a wireless gateway that provides a communication connection between the dedicated timeslots and a trunk of the telecommunications system. Within the wireless gateway each of the dedicated timeslots is assigned to a specific wireless subscriber station of a wireless telephone system. The wireless telephone system is connected to the telecommunications network by a PCS controller. A wireless subscriber station assigned a dedicated timeslot functions on the subscriber line to which that timeslot is assigned equivalently to a hardwireline subscriber station. By connecting the apparatus and one or more hardwireline subscriber stations to a subscriber line a set of extension phones including one or more wireless subscriber stations is created. The wireless subscriber stations provide support of mobility in the set of extension phones.

In a further aspect of the second embodiment of the invention, the wireless gateway contains a first data table associating each dedicated timeslot of the FX-Trunk with a first directory number that is used for call setup over the trunk of the telecommunications system to one of the wireless subscriber stations operating within the wireless radio system. Call setup occurs when a dedicated timeslot has been seized by the channel bank.

In a still further aspect of the second embodiment of the invention, the PCS controller contains a second data table. The second data table associates each wireless subscriber station assigned to a dedicated timeslot with a second directory number. The second directory number is used for call setup to the wireless gateway over the telecommunications network upon receiving an off-hook signal from a wireless subscriber station operating in the wireless radio system.

In an even further aspect of the second embodiment of the invention, the wireless gateway contains a third data table. The third data table associates the second directory number of the wireless subscriber station with a dedicated timeslot of the FX-Trunk. Upon a successful call setup to the wireless gateway over the Trunk of the telecommunications system the wireless gateway receives an off-hook signal from a wireless subscriber station. The third data table associates the second directory number of the wireless subscriber station with the dedicated timeslot assigned the wireless subscriber station. The wireless gateway sets up a call over the FX-Trunk to the subscriber line to which the wireless subscriber station is assigned by referencing the third data table.

BRIEF DESCRIPTION OF THE DRAWINGS

Further aspects, advantages, and novel features of the present invention will become apparent from the following detailed description of the invention when considered in conjunction with the accompanying drawings in which.

DETAILED DESCRIPTION OF THE INVENTION

Figure 1:
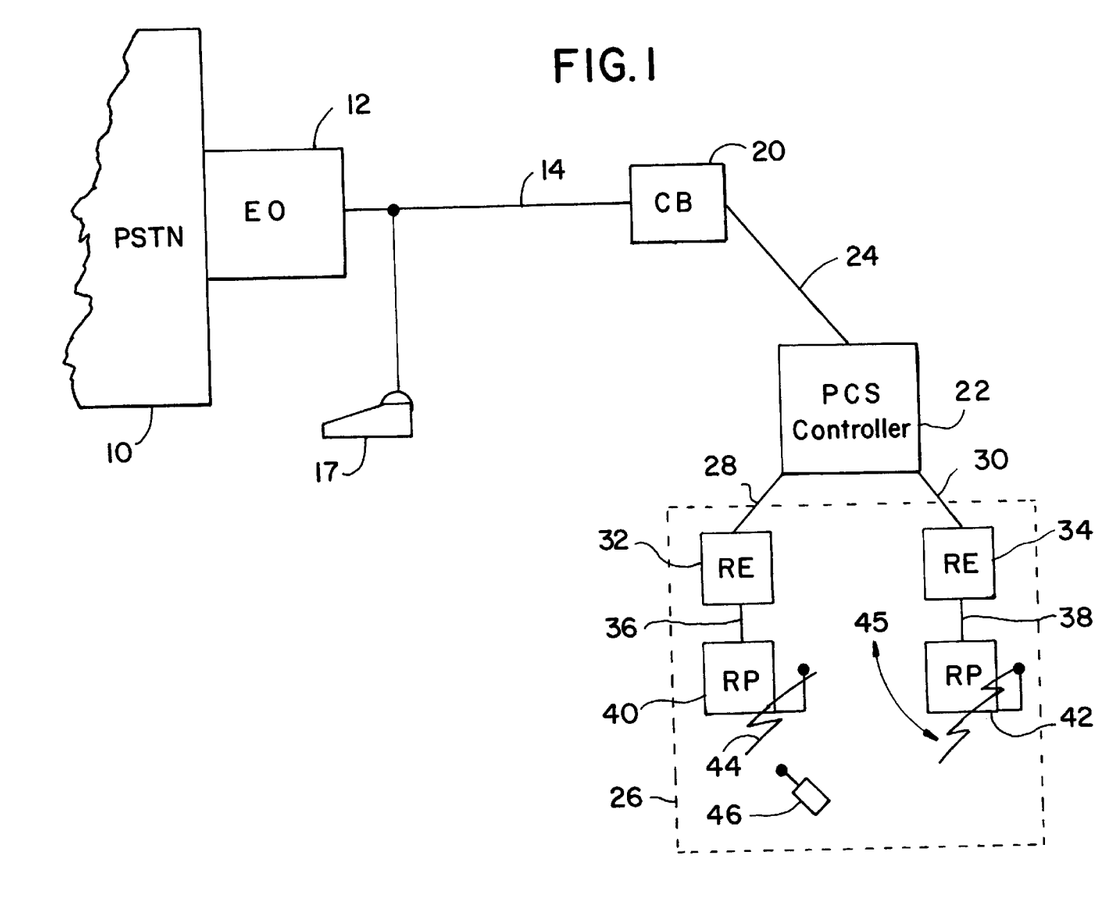
FIG. 1 is a block diagram showing a first embodiment of the invention implemented in the Public Switched Telephone Network.

FIG. 1 is a block diagram showing an implementation of the present invention in the Public Switched Telephone Network (PSTN) 10. An existing End Office (EO) 12 of the PSTN 10 provides wireline services to subscribers. The EO 12 is connected by an analog telephone interface 14 to wireline telephone 17 and a Channel Bank (CB) 20. The CB 20 is connected to a PCS Controller 22 through an FX-Trunk 24. The PCS Controller 22 interfaces to a wireless telephone system 26 through Integrated Services Digital Network Primary Rate Interfaces (PRI) 28 and 30 which are connected to Radio Exchanges (RE) 32 and 34, respectively, of the wireless telephone system 26. REs 32 and 34 are connected through interfaces 36 and 38 to Radio Ports (RP) 40 and 42, respectively. Each RP 40 and 42 has its own coverage area. The RPs 40 and 42 provide radio interfaces 44 and 45, respectively to wireless subscriber stations operating within the system. In FIG. 1, mobile handset (HS) 46 is seen operating in the coverage area of RP 40 and communicating with RP 40 through radio interface 44.

The EO 12 may be of any brand and type of traditional analog telephone set interface to the PSTN 10 which supports Dual Tone Multi Frequency/Touch-Tone(DTMF) signaling. The wireline telephone 17 may be a conventional telephone. Any type of wireline subscriber station usable as an extension phone may be used in place of wireline telephone 17. The CB 20 is connected by a bridged tap (not shown) to an existing subscriber line (not shown) on the analog telephone interface 14. If several handsets are used as extension phones, multiple connections can be bridged at the CB 20. The FX-Trunk 24 provides a T1 connection (1.544 Mbps) between the PCS Controller 22 and the CB 20.

The PCS Controller 22 may be an Ericsson 2/AXE10 stored program control switching system using the P6E software package, or any other suitable commercially available equivalent. The PCS Controller 22 supports authentication, automatic registration, deregistration, roaming and handover for wireless handsets operating within the wireless system 26. These features allow HS 46 to move about with full mobility within the coverage are of the wireless system 26 controlled by the PCS Controller 22. The implementation of those features is common and well understood in the art and will not be explained in detail.

The wireless telephone system 26 can be any type of wireless system which allows the HS 46 to interface with the PCS Controller 22. The use of wireless systems such as the DCT 1900, DCT 1800 or Business wireless telephone systems available from Ericsson Network Systems, or the commercial equivalents of those systems would allow full realization of the possible advantages of the mobility adjunct of the present invention by providing features such as roaming from the coverage area of one RE 40 to another RE 42.

A more complete understanding of the present invention may be had by reference to the following example wherein wireless subscriber A is assigned a set of extension phones including HS 46 and wireline telephone 17. The novel features of the invention allow the set of extension phones assigned to subscriber A to function in the system as if they were extensions on the same general analog subscriber line. All features provided by the wireless system 26 such as mobility and roaming are also provided to subscriber A when using HS 46 as an extension phone.

While, the present invention will be explained in the context of having extension phone sets assigned as described above, it will be understood that any number and combination of wireline telephones and wireless handsets could be assigned as any pairs, or sets larger in number than two, of extension phones. For example, it would be possible to have two wireless handsets function as extension phones in an embodiment of the invention. The invention also could be implemented in telecommunications systems other than the PSTN. For example, the invention could be implemented in a public branch exchange (PBX).

Figure 2A:
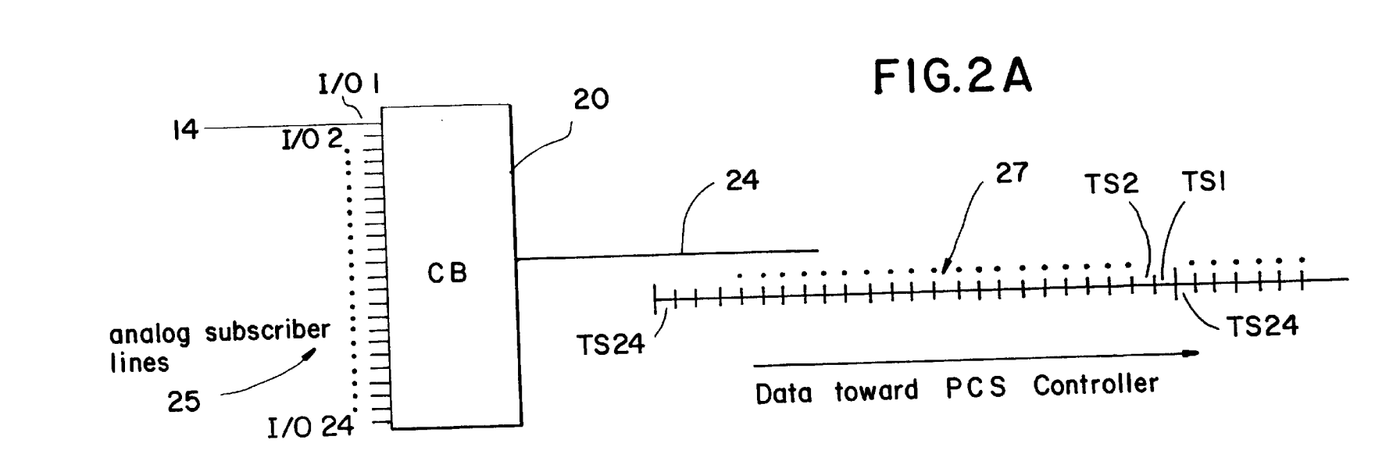
FIG. 2 is an illustrative diagram of call traffic through a channel bank in a system operating according to the teachings of the present invention.
Figure 2B:
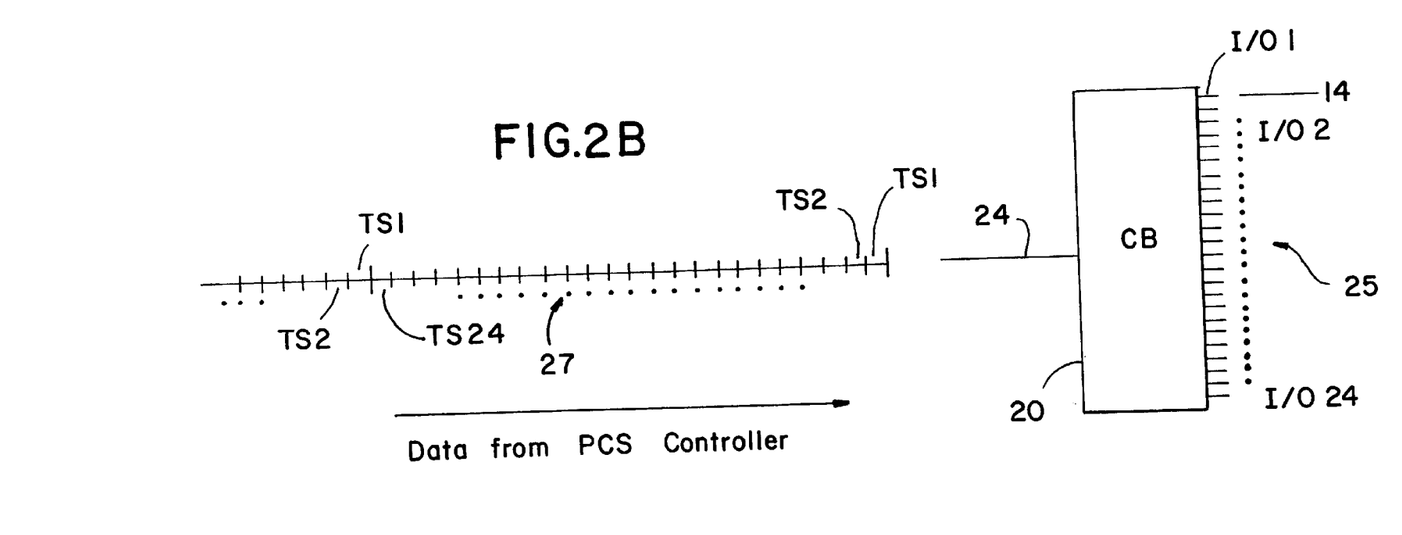

Referring now to FIG. 2, there is an illustrative diagram of call traffic through a channel bank in a system operating according to the teachings of the present invention. In FIG. 2 analog interface 14 is connected to analog input/outputs I/O 1 of CB 20 by a bridged tap 2X (not shown). I/O 2–I/O 24 may be similarly connected to other analog interfaces and more than twenty four lines can be handled by adding additional CBs in parallel, if it is desired to create additional extension phone pairs. The FX-Trunk side of the CB 20 is connected to the PCS Controller 22 through the FX-Trunk 24 over a 1,544 Mbps T1 connection to the PCS Controller 22. The FX-Trunk 24 transmits to (forward direction), and receives from (reverse direction), the PCS Controller 22 using twenty four timeslots 27, each of which handles signals for one of the twenty four analog subscriber I/Os 25 of CB 20. Each one of the analog subscriber line I/Os 25 may be connected through the CB 20 to a dedicated timeslot of the twenty four FX-Trunk timeslots 27 on the FX-Trunk 24. In accordance with the present invention each one of the dedicated twenty four timeslots 27 is designated for a dedicated PCS Controller directory number (DN) and off-hook directory number (off-hook DN) that are contained within a database of PCS Controller 22. The DN and off-hook DN are assigned to a specific HS in the wireless system. In the embodiment shown in FIG. 2, timeslot TS1 is assigned to analog I/O 1. This assigns TS1 to analog interface 14. Timeslot TS1 is then designated for a specific PCS Controller DN and off-hook DN assigned to HS 46.

The PCS Controller 22 will direct signaling between timeslot TS1 and HS 46 using the DN and off-hook DN so that wireline telephone 17 and HS 46 function as extension phones. This includes when an incoming call is received, or when HS 46 goes off hook.

When an incoming call is received in the PSTN 10 intended for Subscriber A, the EO 12 transfers the call to analog subscriber line 14. Analog wireless extension telephone 17 will ring. The call will also be received at I/O 1 of CB 20.

Figure 3:
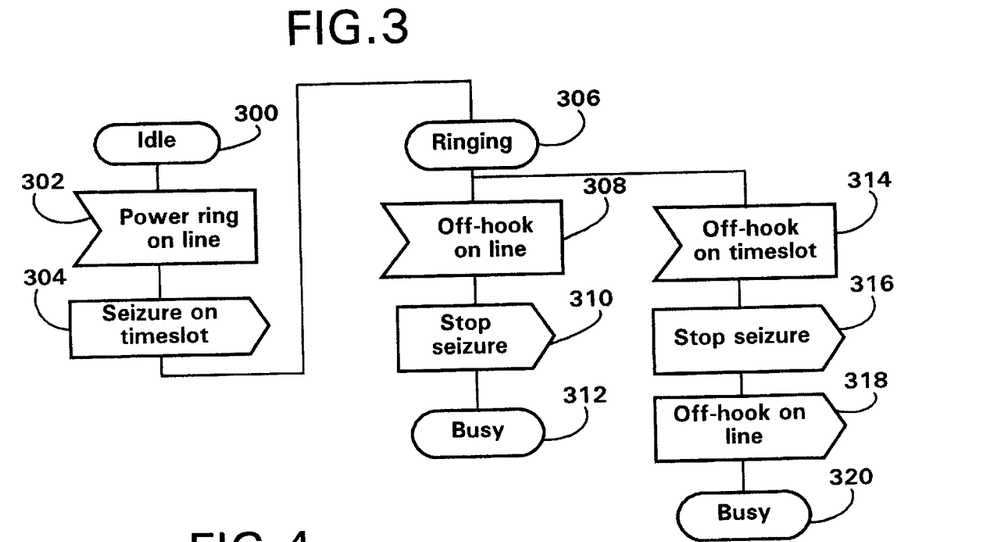
FIG. 3 is a flow diagram which illustrates steps performed by a Channel Bank when a call is received on an analog extension interface.

FIG. 3 is a flow diagram which illustrates steps performed by a Channel Bank when a call is received on an analog extension interface input. At step 300 the CB 20 is idle. At Step 302 the CB 20 detects power ringing on the analog subscriber interface 14. The CB 20 will then move to Step 304. At Step 304 the CB 20 initiates seizure of the dedicated timeslot TS1, that is associated with analog interface 14, in the direction of the PCS Controller 22 on the FX-Trunk 24. The CB 20 now moves to Step 306 as ringing is initiated toward the HS 46 on seized TS1, over the FX-Trunk 24. CB 20 waits at Step 306 as the ringing continues. The PCS Controller 22 will now take control of the call as CB 20 waits at Step 306.

Figure 4:
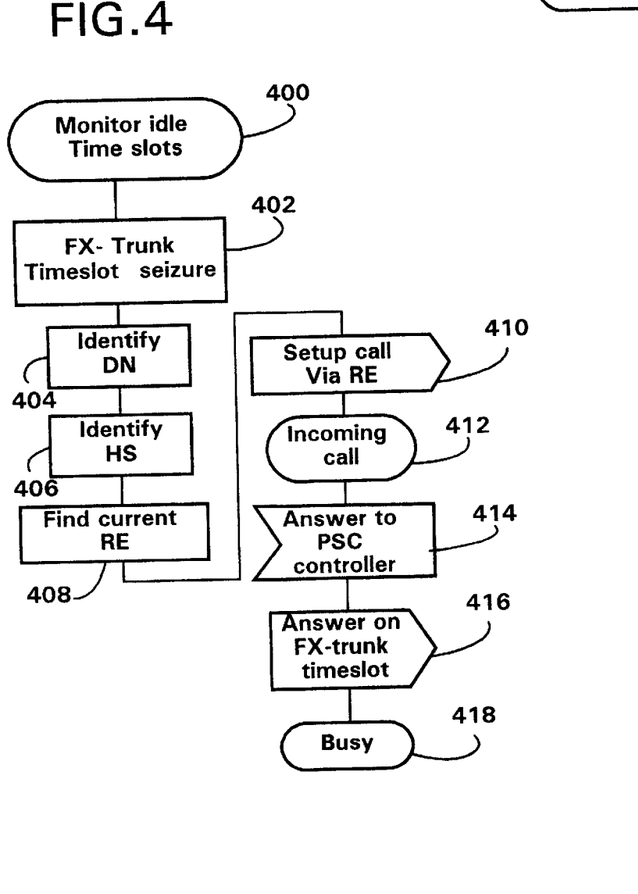
FIG. 4 is a flow diagram which illustrates the steps performed by a PCS Controller when a timeslot is seized on a FX-Trunk input.
Figure 5A:
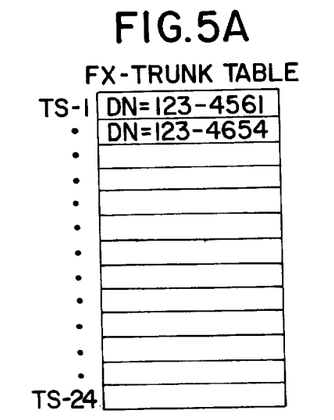
FIGS. 5A–5E illustrate data tables stored within a PCS Controller according to the teachings of the present invention.

FIG. 4 is a flow diagram which illustrates the steps performed according to the teachings of the present invention by a PCS Controller when a timeslot is seized on an FX-Trunk input. At Step 400 the PCS Controller 22 is monitoring the idle timeslots of timeslots 27 on the FX-Trunk 24. At Step 402 the PCS Controller 22 detects that TS1 has been seized by CB 20. Next, at Step 404 the PCS Controller 22 identifies the DN associated with the seized timeslot TS1 by accessing a FX-Trunk table stored in a database of the PCS Controller 22. FIG. 5A illustrates the FX-Trunk table stored in the PCS Controller which associates each timeslot of the FX-Trunk 24 with a DN. In this case, as an example, TS1 is associated with DN 123-4561.

Figure 5B:
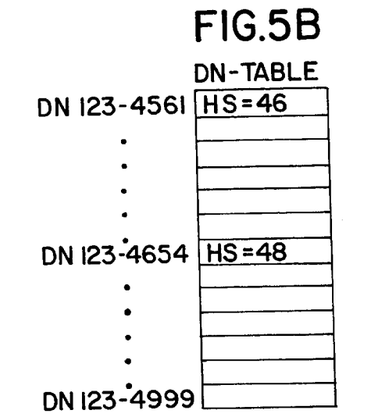

After identifying the DN at Step 404, the process moves to step 406 and the PCS Controller 22 identifies the HS associated with the DN 123-4561 by accessing a DN-Table stored within a database. FIG. SB illustrates the DN-Table stored in the PCS Controller which associates each DN with a specific HS. Here, continuing with the example above, DN 123-4561 is associated with HS 46.

Figure 5C:
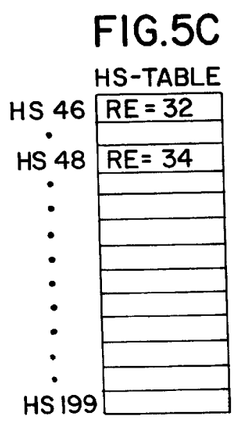

After identifying the HS associated with DN 123-4561 as HS 46 at Step 406, the PCS Controller 22 then moves to Step 408. At Step 408 the PCS Controller 22 determines the current RE location of HS 46 by accessing a HS-Table stored within a data base. FIG. SC illustrates the HS-Table stored in the PCS Controller 22 which associates each HS with its current RE location. This table is updated as the HSs, move about and change their registration location. From the HS-Table, the PCS Controller will identify RE 32 as the RE in which HS 46 is currently located. From Step 408 the PCS Controller 22 moves to Step 410 and sets up the call to HS 46 via PRI 28, RE 32, interface 36 and RP 40 by sending an offer call command to RE 32. The PCS Controller 22 now moves to Step 412 goes into the incoming call state, and waits for an off-hook signal. RE 32 and RP 40 will now take control of the call setup while the PCS Controller 22 waits at Step 412.

Figure 6:
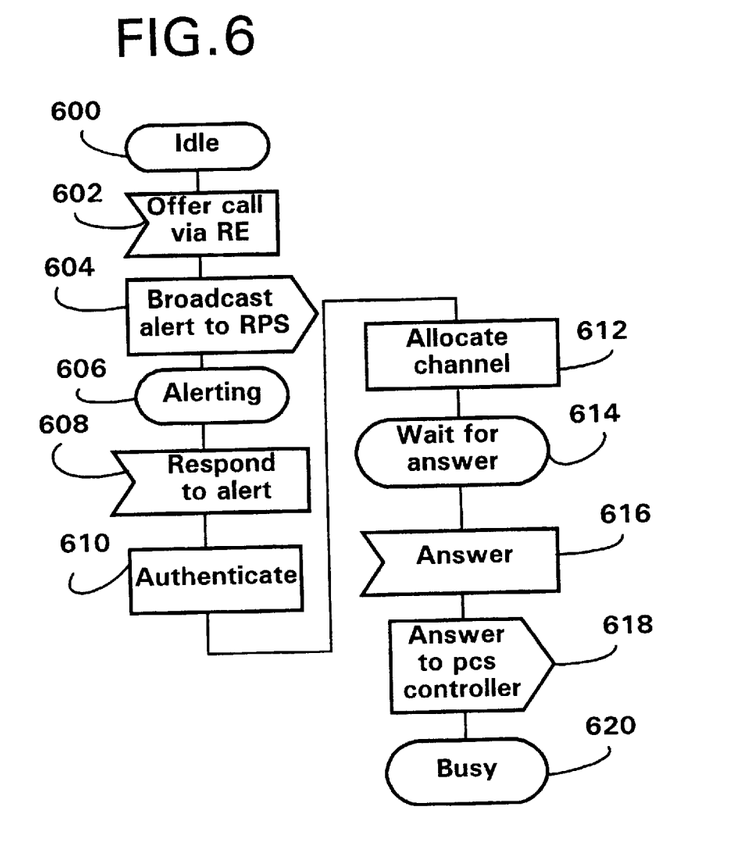
FIG. 6 is a flow diagram which illustrates the steps performed by the Radio Exchanges and Radio Ports during call setup to a Handset.

FIG. 6 is a flow diagram which illustrates the steps performed by software within the REs and RPs during call setup to a HS. At Step 600 the RE 32 is idle. At Step 602 RE 32 receives the offer call command from the PCS Controller 22 over PRI 28. After receiving the offer call command at Step 602, the RE 32 moves to Step 604 and sends a broadcast alert to RP 40 over interface 36. Next, at Step 606 RP 40 broadcasts an alert. RP 40 receives a response to alert and transmits it to RE 32 over interface 36 at Step 608. RE 32 receives the response to the alert and then moves to Step 610 and performs authentication of HS 46. After authenticating HS 46 at Step 610, the RE 32 moves to Step 612 and allocates a channel to HS 46 for the call. The RE 32 now moves to Step 614 and waits for an off-hook signal indicating that HS 46 has answered the call. At Step 616 an off-hook signal from HS 46 is received by the RE software. After receiving the off-hook signal from the HS 46 at Step 616, the RE 32 relays the off-hook signal to the PCS Controller 22 over PRI 28 at Step 618.

Referring again to FIG. 4, control of the process now is handed back to the PCS Controller 22, which receives the off-hook signal from the RE 36 over PRI 28 at Step 414 of FIG. 4. The PCS Controller 22 now moves to Step 416 and connects the off-hook signal to the FX-Trunk timeslot TS1 in the direction of the CB 20. The PCS Controller 22 is now in the busy state at Step 418. Control of the process is now handed back over to the CB 20.

Referring again to FIG. 3, the CB 20 is still in the ringing state of Step 306 of FIG. 3. If analog phone 17 is answered before the off-hook signal from PCS Controller 22 is received, the CB 20 receives the off-hook signal over the analog interface 14 at Step 308, moves to Step 310 and stops the seizure of the timeslot TS1 in the forward direction. If the off-hook signal from the PCS Controller 22 is received first, the CB 20 receives the off-hook signal on timeslot signal on FX-Trunk timeslot TS1 in the reverse direction at Step 314. The CB 20 then moves to Step 316 and stops the seizure of the timeslot. From Step 316, the CB 20 moves to Step 318 and initiates an off-hook signal on the analog interface 14. The call is now connected. HS 46 and analog phone 17 now function as a set of extension phones for this call and the PCS Controller 22 is in the busy state for the extension set.

Figure 7:
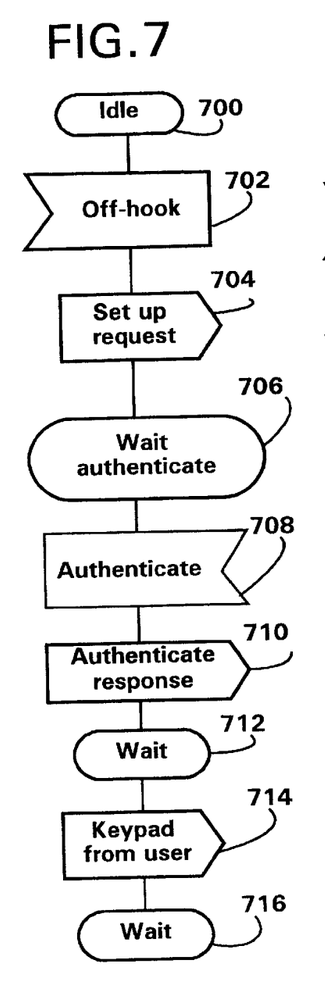
FIG. 7 is a flow diagram which illustrates the steps performed at a Handset when the Handset goes off-hook.

Referring now to FIG. 7, FIG. 7 is a flow diagram which illustrates the steps performed within HS 46 when a call is initiated from the HS 46. At Step 700 the HS 46 is idle. At Step 702 the user initiates a call by going off hook. From Step 702 the process moves to Step 704 where a setup request is sent to the RE 32.

Figure 8:
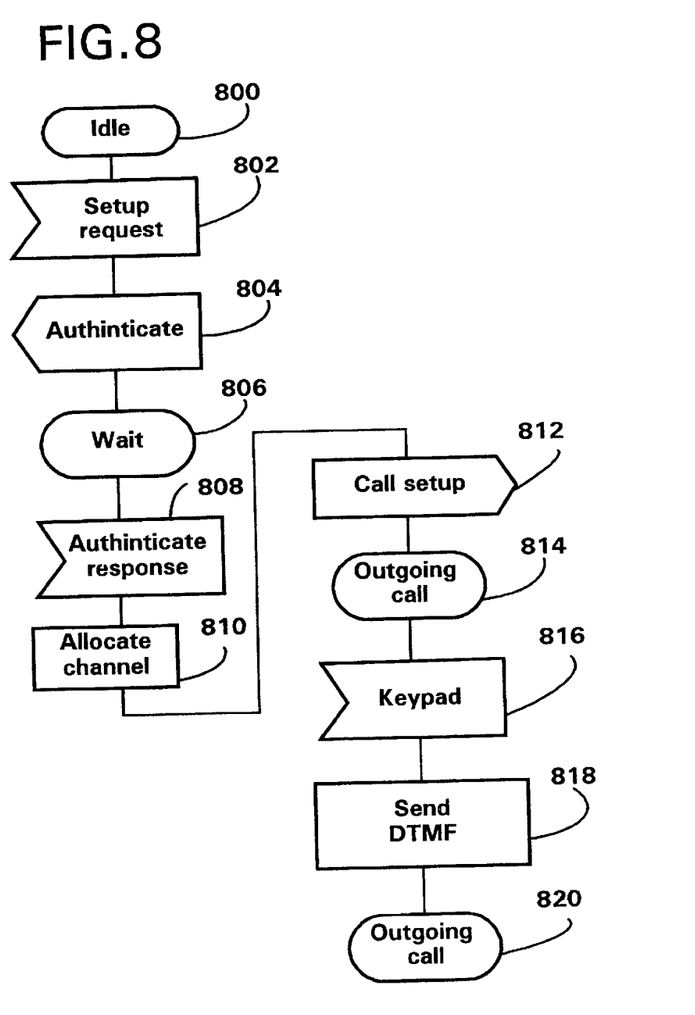
FIG. 8 is a flow diagram which illustrates the steps performed by a Radio Exchange when a call setup request is received.

The setup request will be done according to the procedures used in the particular type of wireless system used for wireless system 26. The following is illustrative of the setup procedure. FIG. 8 is a flow diagram which illustrates the steps performed within the RE 32 when a call setup request from HS 46 is received. RE 32 is idle at Step 800. At Step 802 the setup request from HS 46 is received. The RE 32 then returns an authenticate command to HS 46 via RP 40 and interface 36 at Step 804. The authentication will depend on the particular type of wireless system 26 used. The HS 46 receives the authenticate command at Step 708 of FIG. 7, and returns the authentication response to RE 32 at Step 710. The RE 32 then receives the authentication response at Step 808 of FIG. 8. From Step 808 the process moves to Step 810 where RE 32 allocates a RF channel for the call. After allocating a RF channel the RE software moves to Step 812 and sends a Call Setup request to the PCS Controller 22 via PRI 28. The call initiation process now moves to the PCS Controller 22.

Figure 5D:
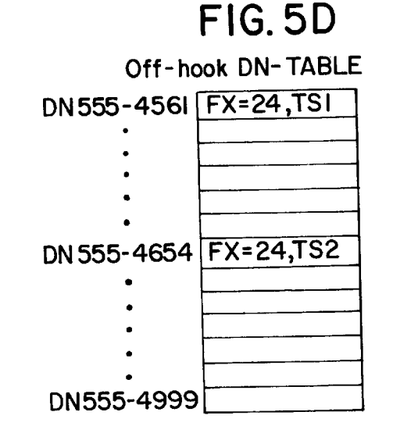
Figure 5E:
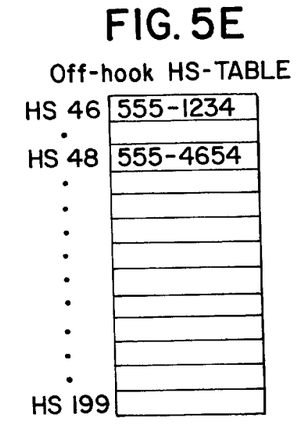
Figure 9:
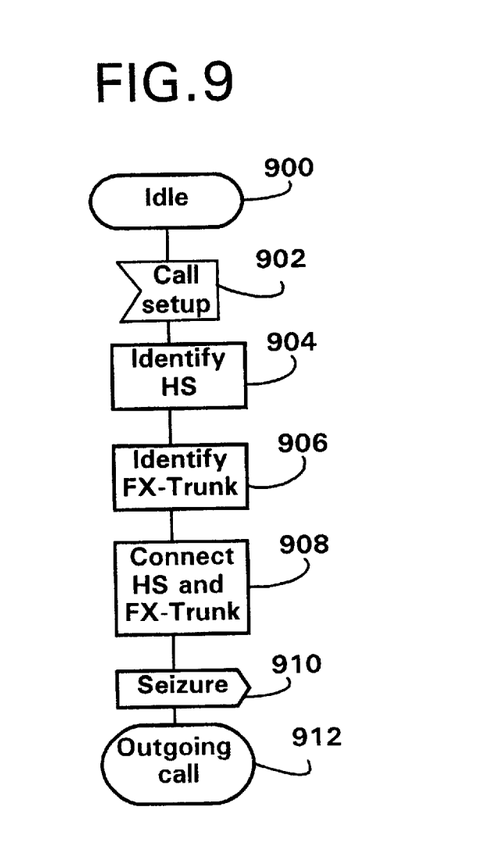
FIG. 9 is a flow diagram which illustrates the steps performed by a PCS Controller when a call setup request is received from a radio exchange.

FIG. 9 is a flow diagram which illustrates the steps performed by a Radio Exchange when a Call Setup request is received. At Step 900 the PCS Controller 22 is idle. At Step 902 the Call Setup command sent from the RE 32 is received at the PCS Controller 22. The process then moves to Step 904 and the PCS Controller 22 identifies the HS 46 connected with the Call Setup. After identifying the HS 46 the PCS Controller 22 identifies the off-hook DN by accessing an off-hook HS table stored in a data base. FIG. 5E illustrates the off-hook HS table stored within the PCS Controller 22 that associates each handset with an off-hook DN. In this example, the HS 46 is associated with off-hook DN 555-1234. The PCS Controller 22 then uses the off-hook DN to identify the FX-Trunk, and the timeslot on the FX-Trunk associated with HS 46 in a off-hook data table. FIG. 5D illustrates the off-hook DN-table stored in the PCS Controller software that associates each off-hook DN with a timeslot on an FX-trunk. Continuing with the example above the off-hook DN 555-1234 is associated with timeslot 1 on FX-trunk 24. The PCS Controller 22 then moves to step 908 and initiates a connection between HS 46 and TS 1 on FX-trunk 24. After connecting the HS 46 and FX-Trunk 24 the PCS software then moves to Step 910 and seizes TS1 in the reverse direction on the FX-Trunk 24. The PCS Controller 22 now is in the outgoing call state at Step 912.

The process now returns to FIG. 8 where the RE 32 is put in the outgoing call state at Step 814. Dial tone is now received at HS 46 via FX-Trunk 24, PCS Controller 22, RE 32, RP, and radio channel 44. The user can now enter keypad entry at Step 714 of FIG. 7 with the keypad entry being transferred to the RE 32 at Step 816. After receiving the keypad entry the RE 32 moves to Step 818, where the keypad entry is converted to DTMF and sent through RPI 28, PCS Controller 22, FX-Trunk 24, CB 20 and analog interface 14 to the existing end office EO 12. The call is now processed and connected by EO 12. Analog phone 17 and HS 46 now function as a set of extension phones on the outgoing call.

Figure 10:
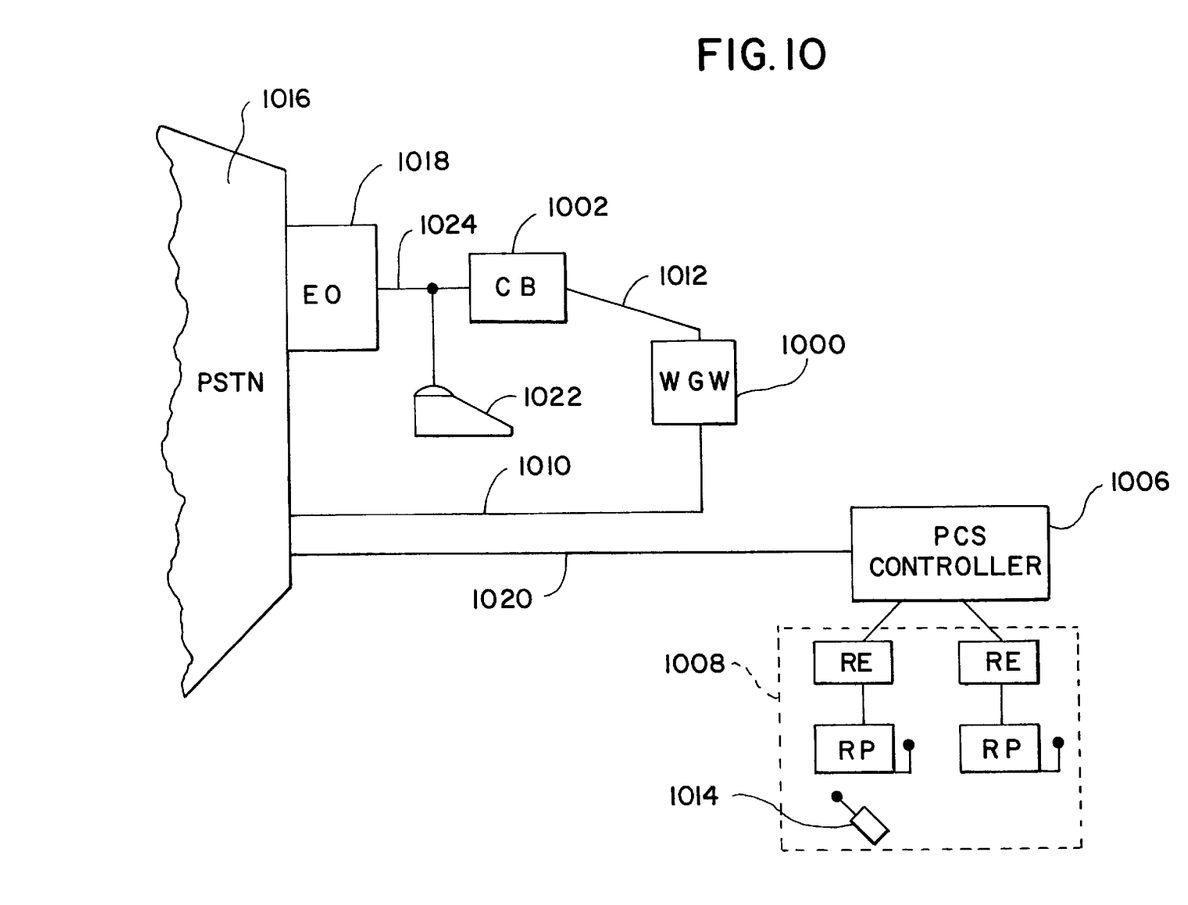
FIG. 10 is a block diagram illustrating a second embodiment of the invention implemented in a public switched telephone network.

In a second embodiment of the invention, extension phone service is implemented using a wireless extension gateway (WGW) to implement the function of connecting a dedicated timeslot on the FX-Trunk with an associated DN number for an HS operating in a wireless network. The WGW may be an Ericsson 2/AXE10 stored program control switching system using the P6E software package, or any other suitable commercially available equivalent. FIG. 10 is a block diagram illustrating the second embodiment of the invention implemented in the Public Switched Telephone Network. The second embodiment functions nearly identical to the first embodiment with the exception that the function of associating the dedicated timeslot with a DN for an HS on an incoming call, and the function of associating a particular HS with an off-hook DN for an outgoing call, are removed from the PCS controller and performed in the WGW. In FIG. 10 the WGW 1000 is connected to Channel Bank (CB) 1002 through FX-Trunk 1012, and then to the PSTN 1016 through a PSTN-Trunk 1010. CB 1002 is connected by analog telephone interface 1024 to an end office (EO) 1018 of PSTN 1016. Wireline telephone 1022 is connected to the analog interface 1024. PCS Controller 1006 controlling wireless system 1008 is connected to the PSTN 1016 in a conventional manner through PSTN-Trunk 1020. The PCS Controller 1006 may be an Ericsson 2/AXE10 stored program control switching system using the P6E software package, or any other suitable commercially available equivalent. Wireless telephone system 1008 may be identical to wireless telephone system 26 as described for FIG. 1. The equipment used to implement EO 1018 may be of any brand and type of traditional analog telephone set interface to the PSTN 1016 that supports Dual Tone Multi-Frequency/ Touch Ton (DTMF) signaling. Wireline telephone 1022 may be a conventional telephone. CB 1002 is connected by a bridged tap (not shown) to an existing subscriber line in the analog telephone interface 1024. Multiple connections may be bridged at the CB 1002 to allow multiple handsets to be used as extension phones. The other side of the CB 1002 uses the FX-Trunk 1012 over a T1 connection (1.544 Mbps) (not shown) to the WGW 1000. The second embodiment shown in FIG. 10 provides extension service identical to the extension service provided by the embodiment shown in FIG. 1, with HS 1014 and analog phone 1022 functioning as the extension phones.

Figure 11A:
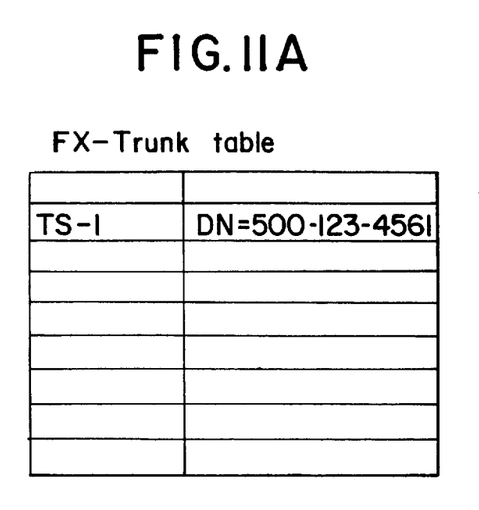
FIGS. 11A and 11B illustrate data tables stored within a wireless gateway according to the teachings of the present invention.

When a call is received on the analog interface 1024, the CB 1002 detects power ringing on analog interface 1024 and seizes timeslot TS1 on the FX-Trunk 1012 in the forward direction toward the WGW 1000. WGW 1000 notices seizure of TS1. WGW 1000 then accesses a FX-Trunk table to determine the DN associated with TS1. FIG. 11A illustrates the WGW FX-Trunk table. In this example, TS1 is associated with DN 500-123-4561. WGW 1000 then sets up a call to DN 500-123-4561 through the PSTN-Trunk 1010 over the PSTN 1004. The PSTN 1016 receives the call setup and initiates a call to the HS 1014 through PSTN-Trunk 1020 through PCS Controller 1006 and the wireless system 1008. When HS 1014 goes off hook to answer, the off-hook signal will be transferred back to the WGW 1000 through the PSTN 1016 over PSTN-Trunk 1010. When the off-hook signal is received from PSTN 1016, the WGW 1000 through connects the PSTN-Trunk 1010 with the FX-Trunk 1012 and sends an off-hook signal on TS1 of the FX-Trunk 1012 to the CB 1002. CB 1002 stops seizure of TS1 and switches the off-hook signal to analog telephone interface 1024 as described for the first embodiment. HS 1014 is now connected to the call and telephone 1022 and HS 1014 function as extension phones.

When a user initiates a call setup request from HS 1014, PCS Controller 1006 routes the call setup request received from wireless system 1008 to a DN-number of PSTN 1004 used as an off-hook DN-number by accessing an off-hook HS-Table stored within a data base of PCS Controller 1006. The off-hook DN-number would lead to the WGW 1000 over the PSTN 1004 and not be used as an internal address within the PCS controller, as was the case in the first embodiment of the invention. As an alternative to accessing an off-hook HS-Table, HS 1014 could include the off-hook DN within itself, in a memory, and request a call setup to the WGW 1000 through PSTN 1016 when going off-hook.

Figure 11B:
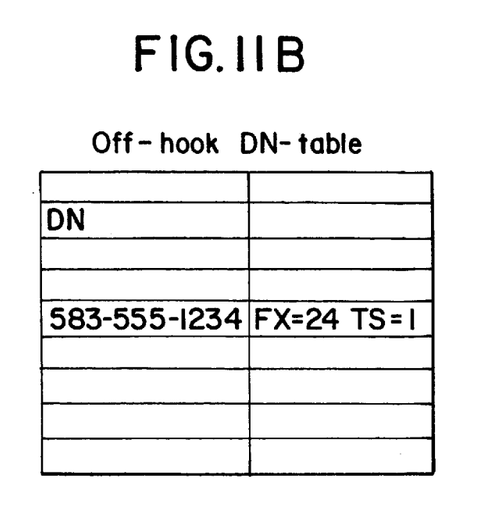

When WGW 1000 receives a call made through either of the above alternatives on PSTN-Trunk 1010, the received off-hook DN-number is used as an index in an off-hook DN-Table contained in a data base of WGW 1000 to determine to connect the call to TS1 on FX-Trunk 1012. FIG. 11B shows the DN-table contained in the WGW. In this example the off hook DN 583-555-1234 is associated with FX-Trunk 1012 and TS1 of FX-Trunk 1012. WGW 1000 then sends a seizure signal on TS1 of FX-Trunk 1012 in the reverse direction towards CB 1002. CB 1002 then connects TS1 to analog interface 1024 and an off-hook signal is received at WGW 1000. WGW 1000 now through connects TS1 in the forward direction with timeslots on the PSTN-Trunk and HS 46 receives dial tone as described for the first embodiment. HS 46 can now initiate the call, with HS46 and wireline telephone 1022 functioning as an extension phones.

As has been described, the invention provides an apparatus that allows a mobile wireless telephone to be used as an extension phone. It will be apparent to one skilled in the art that the invention has application to all types of telecommunications networks in which a wireless telephone system may be implemented and that many variations of the invention are possible.

It is thus believed that the operation and construction of the present invention will be apparent from the foregoing description. While the system and method has been shown and described as a particular embodiment, it will be readily apparent that various changes and modifications could be made therein without departing from the spirit and scope of the invention as defined in the claims.

What is claimed is:

1. In a telecommunications network comprising a subscriber line connected to an end office and a given wireline communications terminal, a trunk connection providing one or more timeslots for communications traffic in the forward and reverse direction, a channel bank connected between said subscriber line and said trunk connection, said channel bank providing a communications connection between a call on said subscriber line and a timeslot of said one or more timeslots of said trunk connection dedicated to the subscriber line, a wireless telephone system, a wireless communications terminal operating within said wireless telephone system, and a mobility adjunct controller connected between said trunk connection and said wireless telephone system, a method for providing a mobility adjunct service to said subscriber line, said method comprising the steps of:

receiving a wireline call on said subscriber line;

seizing said dedicated timeslot of said trunk connection in the forward direction at said channel bank;

detecting seizure of said dedicated timeslot in the forward direction at said mobility access controller;

identifying a directory number for the wireless communications terminal associated with said dedicated seized timeslot;

initiating a call setup using the identified directory number from said mobility adjunct controller to said wireless subscriber station through said wireless telephone system; and  connecting for communication, through the channel bank, the seized timeslot of the trunk connection and the mobility adjunct controller, the setup call initiated in said wireless telephone system with said received wireline call on said subscriber line.

2. In a telecommunications network comprising a subscriber line connected to an end office and a given wireline communications terminal, a trunk connection providing one or more timeslots for communications traffic in the forward and reverse direction, a channel bank connected between said subscriber line and said trunk connection, said channel bank providing a communications connection between said subscriber line and a timeslot of said one or more timeslots of said trunk connection dedicated to the subscriber line, a wireless telephone system, a wireless communications terminal operating within said wireless telephone system, and a mobility adjunct controller connected between said trunk connection and said wireless telephone system, a method for providing a mobility adjunct service to said subscriber line, said method comprising the steps of:

receiving an off-hook signal from and establishing a call connection with said wireless communications terminal at said mobility adjunct controller and through said wireless telephone system;

said dedicated timeslot of said trunk connection associated with said wireless subscriber station;

seizing said identified dedicated timeslot in the reverse direction at said mobility adjunct controller; and connecting for communication, through the channel bank, the seized dedicated timeslot and the mobility adjunct controller, the established call connection with said wireless communications terminal to said subscriber line.

3. In a telecommunications network comprising a subscriber line connected to an end office and a given wireline communications terminal, a trunk connection providing one or more timeslots for communications traffic in the forward and reverse directions, a channel bank connected between said subscriber line and said trunk connection, said channel bank providing a communications connection between a call on said subscriber line and a timeslot of said one or more timeslots of said trunk connection dedicated to the subscriber line, a wireless telephone system, a wireless communications terminal operating within said wireless telephone system, a PSTN-trunk, a mobility adjunct controller connected between said PSTN-Trunk and said wireless telephone system, and a wireless gateway connected between said trunk connection and the PSTN-Trunk, a method for providing a mobility adjunct service to the subscriber line, said method comprising the steps of:

receiving a wireline call on said subscriber line;
seizing said dedicated timeslot of said trunk connection in the forward direction at said channel bank;
detecting seizure of said dedicated timeslot in the forward direction at said wireless gateway;
identifying a directory number for the wireless communications terminal associated with said dedicated seized timeslot;
initiating a call setup from said wireless gateway to the wireless communications terminal associated with said identified directory number using said PSTN-Trunk, said mobility access controller and the wireless telephone system; and
connecting for communication, through the channel bank, the seized timeslot of the trunk connection, the wireless gateway, the PSTN-Trunk and the mobility adjunct controller, the setup call initiated by the wireless gateway with the wireless communications terminal to said received wireline call on said subscriber line.

4. In a telecommunications network comprising a subscriber line connected to an end office and a given wireline communications terminal, a trunk connection providing one or more timeslots for communications traffic in the forward and reverse directions, a channel bank connected between said subscriber line and said trunk connection, said channel bank providing a communications connection between said subscriber line and a timeslot of said one or more timeslots of said trunk connection dedicated to the subscriber line, a wireless telephone system, a wireless communications terminal operating within said wireless telephone system, a PSTN-trunk, a mobility adjunct controller connected between said PSTN-Trunk and said wireless telephone system, and a wireless gateway connected between said trunk connection and the PSTN-Trunk, a method for providing a mobility adjunct service to said subscriber line, said method comprising the steps of:

receiving an off-hook signal from and establishing a call connection with said wireless communications terminal at said mobility adjunct controller;
initiating a call on behalf of the wireless communications terminal from said mobility access controller over the PSTN-Trunk to said wireless gateway;
identifying said dedicated timeslot associated with said wireless communications terminal party to the initiated call;
connecting said initiated call to said identified dedicated timeslot of said trunk connection at said wireless gateway;
connecting for communication, through the channel bank, the seized timeslot of the trunk connection, the wireless gateway, the PSTN-Trunk and the mobility adjunct controller, the call connection with the wireless communications terminal and the call initiated by the mobility adjunct controller to said subscriber line.

5. A system for providing a mobility adjunct to a subscriber line of a public switched telephone network, the subscriber line terminated at a wireline communications terminal, the mobility adjunct provided through a wireless communications system including means for establishing a radio frequency communications connection with a wireless communications terminal, the system comprising:

a trunk communications link having a first and second ends;
a channel bank connected to the subscriber line and to the first end of the trunk communications link to interface a given communication carried on the subscriber line to a selected one of a plurality of time slots maintained with respect to the trunk communications link; and
a mobility adjunct controller connected to the second end of the trunk communications link and to the wireless communications system, the controller interfacing the radio frequency communication connection for the wireless communications terminal to the selected timeslot interfaced with the subscriber line and maintained with respect to the trunk communications link, the controller accordingly enabling the given communication carried over the subscriber line associated with the wireline communications terminal to also be connected from the channel bank through the trunk communications link and over the radio frequency communication connection with the wireless communications terminal.

6. The system of claim 5 wherein the operation of the channel bank, trunk communications link and mobility adjunct controller enables the wireline communications terminal and the wireless communications terminal to function as a set of extension communications terminals utilizing the subscriber line associated with the wireline communications terminal.

7. The system of claim 5 wherein the trunk communications link comprises an FX trunk.

8. The system of claim 5 wherein the mobility adjunct controller includes:

a first data table, said first data table associating the selected timeslot with a first directory number, the first directory number used for making a call setup to the wireless communications terminal.

9. The system of claim 8 wherein the mobility adjunct controller further includes:

a second data table, said second data table associating the wireless communications terminal with a second directory number, the second directory number used for making a call setup from the wireless communications terminal; and
a third data table, said third data table associating the second directory number with the selected timeslot, the selected timeslot used in making the call setup from the wireless communications terminal.

10. The system of claim 5 wherein the wireless communications network comprises:

a radio switching exchange connected to the mobility adjunct controller; and a radio port connected to the radio switching exchange and including means for establishing a radio interface with the wireless communications terminal.

11. The system of claim 5 wherein the subscriber line comprises an analog telephone line connected to both the wireline communications terminal and to the channel bank.

12. A system for providing a mobility adjunct to a subscriber line of a public switched telephone network, the subscriber line terminated at a wireline communications terminal, the mobility adjunct provided through a wireless communications system including means for establishing a radio frequency communications connection with a wireless communications terminal, the system comprising:

a first trunk communications link having a first end and a second end:

a channel bank connected to the subscriber line and to the first end of the first trunk communication link to interface a given communication carried by the subscriber line to a selected one of a plurality of time slots maintained with respect to the first trunk communications link;

a second trunk communications link having a first end and a second end, the second end of the second trunk communications link being connected to the public switched telephone network;

a gateway node connected to the second end of the first trunk communications link and the first end of the second trunk connection to interface for communication on the time slot a call connection over the second trunk communications link and the public switched telephone network;

a third trunk communications link having a first end and a second end, the first end of the second trunk communications link being connected to the public switched telephone network; and a mobility adjunct controller connected to the second end of the third trunk communications link supporting the call connection through the public switched telephone network and over the second trunk communications link to the gateway node, and also connected to the wireless communications system, the controller interfacing the radio frequency communication for the wireless communications terminal to the call connection, and the gateway interfacing the call connection to the selected timeslot interfaced with the subscriber line and maintained with respect to the first trunk communications link, the controller and gateway accordingly enabling the given communication carried over the subscriber line associated with the wireline communications terminal to also be connected from the channel bank through the first, second and third trunk communications links and over the radio frequency communications connection with the wireless communications terminal.

13. The system of claim 12 wherein the operation of the channel bank, first, second and third trunk communications links, gateway node and mobility adjunct controller enables the wireline communications terminal and the wireless communications terminal to function as a set of extension communications terminals utilizing the subscriber line associated with the wireline communication terminal.

14. The system of claim 12 wherein the first trunk communications link comprises an FX trunk, and the second and third trunk communications links comprise public switched telephone network trunks.

15. The system of claim 12 wherein the gateway includes:

a first data table, said first data table associating the selected timeslot with a first directory number, the first directory number used for making a call setup to the wireless communications terminal.

16. The system of claim 15 wherein the gateway further includes:

a second data table, said second data table associating the wireless communications terminal with a second directory number, the second directory number used for making a call setup from the wireless communications terminal; and a third data table, said third data table associating the second directory number with the selected timeslot, the selected timeslot used in making the call setup from the wireless communications terminal.

17. The system of claim 12 wherein the wireless communications network comprises:

a radio switching exchange connected to the mobility adjunct controller; and a radio port connected to the radio switching exchange and including means for establishing a radio interface with the wireless communications terminal.

18. The system of claim 12 wherein the subscriber line comprises an analog telephone line connected to both the wireline communications terminal and to the channel bank.

* * * * *